(12) United States Patent
Wada

(10) Patent No.: US 11,316,993 B2
(45) Date of Patent: Apr. 26, 2022

(54) IMAGE FORMING APPARATUS

(71) Applicant: BROTHER KOGYO KABUSHIKI KAISHA, Nagoya (JP)

(72) Inventor: Tomohiro Wada, Nagoya (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 0 days.

(21) Appl. No.: 17/083,009

(22) Filed: Oct. 28, 2020

(65) Prior Publication Data

US 2021/0136242 A1 May 6, 2021

(30) Foreign Application Priority Data

Oct. 31, 2019 (JP) .............................. JP2019-198965

(51) Int. Cl.
*H04N 1/00* (2006.01)
(52) U.S. Cl.
CPC ..... *H04N 1/00557* (2013.01); *H04N 1/00408* (2013.01); *H04N 1/00496* (2013.01); *H04N 1/00631* (2013.01)

(58) Field of Classification Search
CPC ....... H04N 1/00278; H04N 2201/0084; H04N 2201/0015; H04N 2201/0041; H04N 2201/0049; H04N 2101/00; H04N 1/33376; H04N 2201/33321; H04N 2201/3204; H04N 2201/3278; H04N 1/00973; H04N 1/33315; H04N 2201/0074; H04N 2201/33328; H04N 2201/33335; H04N 2201/001; H04N 2201/0055; H04N 2201/0094; H04N 1/00307; H04N 1/00127; H04N 1/00411; H04N 1/00519; H04N 2201/0051; H04N 2201/0087; H04N 5/765; H04N 5/772; H04N 5/907; H04N 1/00206; H04N 1/00244; H04N 1/00347; H04N 1/00408; H04N 1/00474; H04N 1/0048; H04N 1/00482; H04N 1/00925; H04N 1/32358; H04N 1/32379; H04N 1/32512;
(Continued)

(56) References Cited

U.S. PATENT DOCUMENTS 7,990,555 B2 * 8/2011 Kato ................... H04N 1/00278
358/1.15
9,449,261 B2 * 9/2016 Yoneda .............. H04N 1/00127
(Continued)

FOREIGN PATENT DOCUMENTS

JP 2010-191165 A 9/2010

*Primary Examiner* — Negussie Worku
(74) *Attorney, Agent, or Firm* — Baker Botts L.L.P.

(57) ABSTRACT

An image forming apparatus includes a housing, a discharging tray provided at an upper surface of the housing and onto which a sheet is to be discharged, an operation panel provided to the housing outside the discharging tray in a width direction perpendicular to a discharging direction of the sheet, at least a portion of the operation panel protruding with respect to a side face of the housing in the width direction, and a USB port provided at the side face of the housing in the width direction the USB port being arranged at the side face of the housing where the operation panel protrudes, on a downstream side with respect to the operation panel in the discharging direction, at a position that is lower than an upper end of the operation panel and is higher than a lower end of the operation panel.

12 Claims, 9 Drawing Sheets

(58) Field of Classification Search
CPC ... H04N 2201/0013; H04N 2201/0027; H04N
2201/0046; H04N 2201/0053; H04N
2201/0062; H04N 2201/0065; H04N
2201/0068; H04N 2201/0072; H04N
2201/329; H04N 2201/33314; H04N
9/7921; H04N 9/8042; H04N 9/8047;
H04N 1/32117; H04N 2201/0036; H04N
2201/0044; H04N 2201/0098; G06F
3/1293; G06F 3/1204; G06F 3/1236;
G06F 3/1205; G06F 3/128; G06F 3/1209;
G06F 3/1254; G06F 3/1284; G06F
3/1285; G06F 3/1287; G06F 3/1288;
G06F 3/1206; G06F 3/1247; G03G
15/5016; G03G 15/5066; G03G 15/80;
G03G 2215/00088; G06K 15/4045; G06K
15/1809; H04M 1/72412
USPC .................................................. 358/474, 1.15
See application file for complete search history.

(56) References Cited

U.S. PATENT DOCUMENTS

| | | | |
|---|---|---|---|
| 2003/0222985 A1* | 12/2003 | Goto | H04N 1/00278 |
| | | | 348/207.2 |
| 2004/0041865 A1* | 3/2004 | Yano | G06F 3/1293 |
| | | | 347/14 |
| 2013/0141758 A1* | 6/2013 | Yoneda | G03G 15/5066 |
| | | | 358/1.15 |
| 2016/0011823 A1* | 1/2016 | Muroi | H04N 1/00206 |
| | | | 358/1.13 |
| 2021/0136242 A1* | 5/2021 | Wada | H04N 1/00408 |

\* cited by examiner

IMAGE FORMING APPARATUS

CROSS-REFERENCE TO RELATED APPLICATION

This application claims priority under 35 U.S.C. § 119 from Japanese Patent Application No. 2019-198965 filed on Oct. 31, 2019. The entire subject matter of the application is incorporated herein by reference.

BACKGROUND

Technical Field

Aspects of the present disclosure relate to an image forming apparatus provided with a USB port.

Related Art

There has been known an image forming apparatus to which a USB port is provided so that the image forming apparatus can directly read data stored in a USB memory attached to the USB port. In such a conventional image forming apparatus, an interface section including the USB port is provided at a side face of a main body of the image forming apparatus, and the side face is formed to protrude with respect to the interface section to secure a passage for accessing the interface section from the front side of the image forming apparatus without displacing the main body.

SUMMARY

However, in the conventional image forming apparatus, an operation panel is typically arranged at the front side of the image forming apparatus, whereas the interface section is typically arranged near the rear face of the image forming apparatus. Therefore, a distance between an operating position for operating the operation panel and an operating position for operating the interface section is long and thus operability of the image forming apparatus is low.

Furthermore, in the conventional image forming apparatus, the USB port provided thereto is often arranged at an outer surface of the main body to secure accessibility by the user. With such configuration, the USB memory inserted to the USB port protrudes from the outer surface of the main body. Therefore, there is a risk that an unintended impact is applied to the USB memory when a user moves around or operates the image forming apparatus. Accordingly, in the conventional image forming apparatus provided with the USB port, there is a high risk that the USB memory and/or a connector for connecting the USB memory provided on a substrate are damaged.

According to aspects of the present disclosure, there is provided an image forming apparatus including a housing, a discharging tray provided at an upper surface of the housing and onto which a sheet is to be discharged, an operation panel provided to the housing outside the discharging tray in a width direction perpendicular to a discharging direction of the sheet, at least a portion of the operation panel protruding with respect to a side face of the housing in the width direction, and a USB port provided at the side face of the housing in the width direction, the USB port being arranged at the side face of the housing where the operation panel protrudes, on a downstream side with respect to the operation panel in the discharging direction, at a position that is lower than an upper end of the operation panel and is higher than a lower end of the operation panel.

According to aspects of the present disclosure, there is further provided an image forming apparatus including a housing having an opening, a cover configured to open and close the opening, a discharging tray provided at an upper surface of the housing and onto which a sheet is to be discharged, an operation panel provided to the housing outside the discharging tray in a width direction, at least a portion of the operation panel protruding with respect to a side face of the housing in the width direction, and a USB port provided at a side face of the housing in the width direction, the USB port being arranged at the side face of the housing where the operation panel protrudes, between the operation panel and the cover, and at a position that is lower than an upper end of the operation panel and is higher than a lower end of the operation panel.

BRIEF DESCRIPTION OF THE ACCOMPANYING DRAWINGS

DETAILED DESCRIPTION

[Overall Configuration of Image Forming Apparatus]

Figure 1:
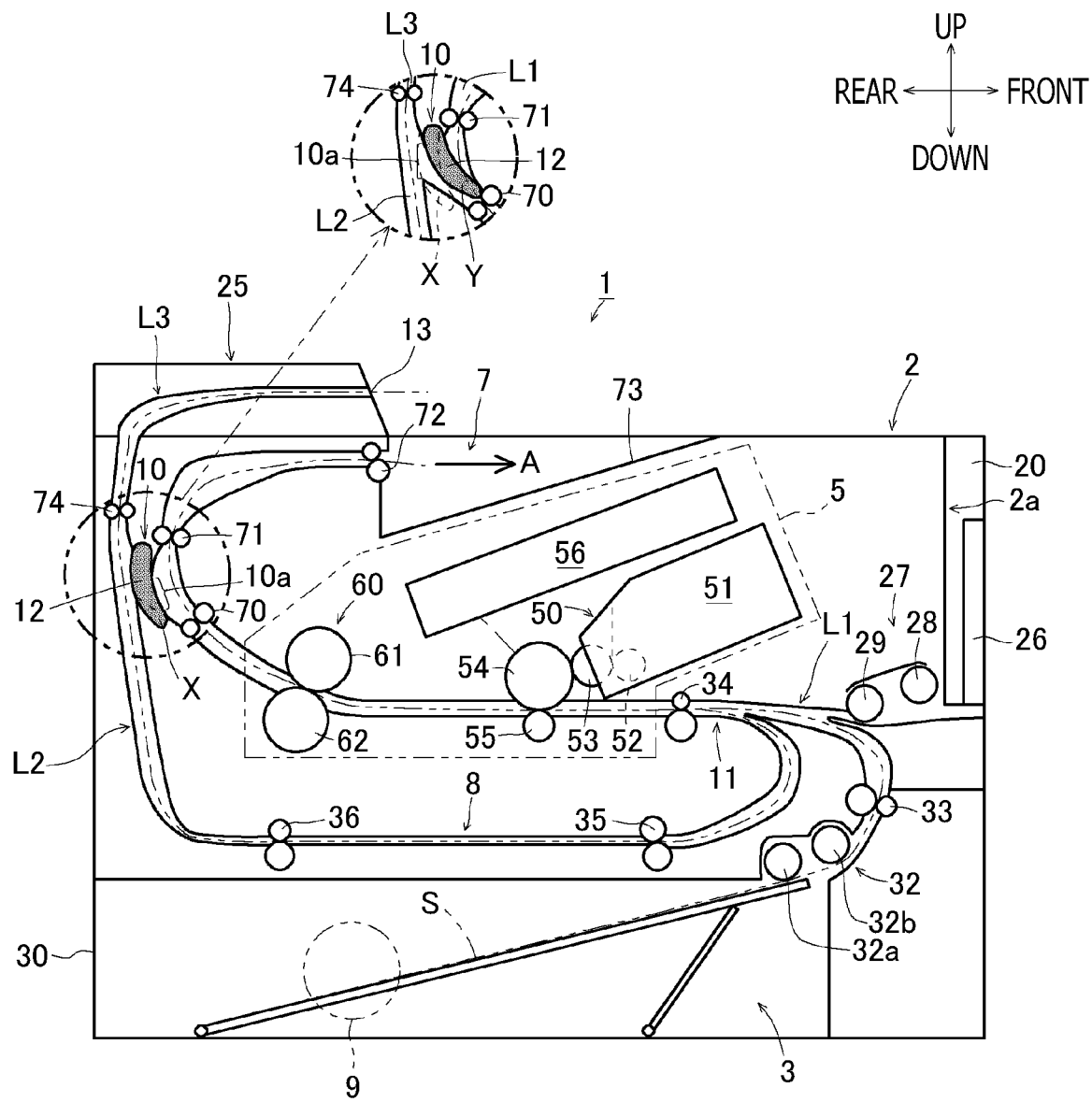
FIG. 1 is a cross-sectional side view of an image forming apparatus according to an embodiment of the present disclosure.
Figure 2:
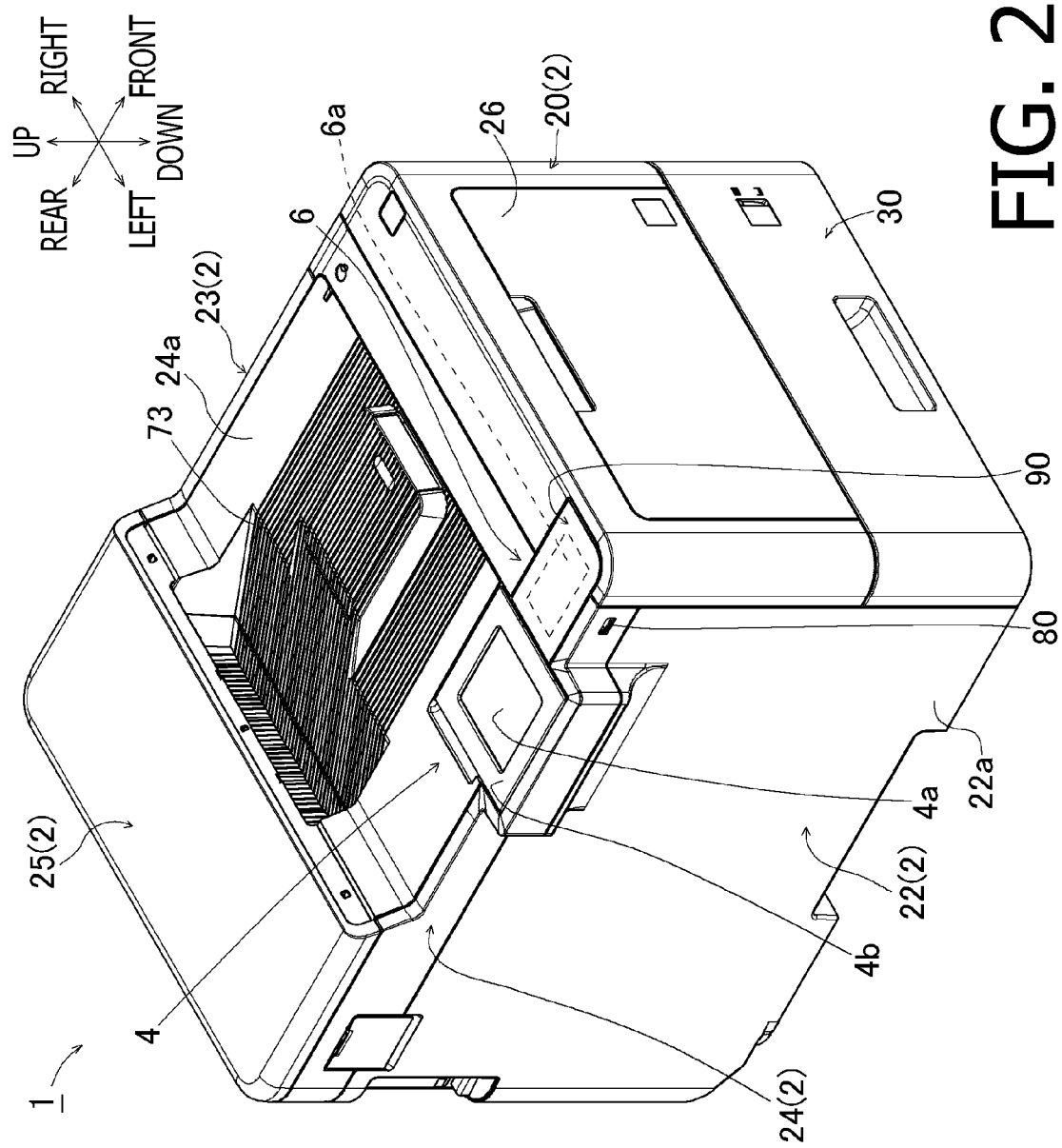
FIG. 2 is a perspective view of the image forming apparatus in a state where an openable cover is closed.
Figure 3:
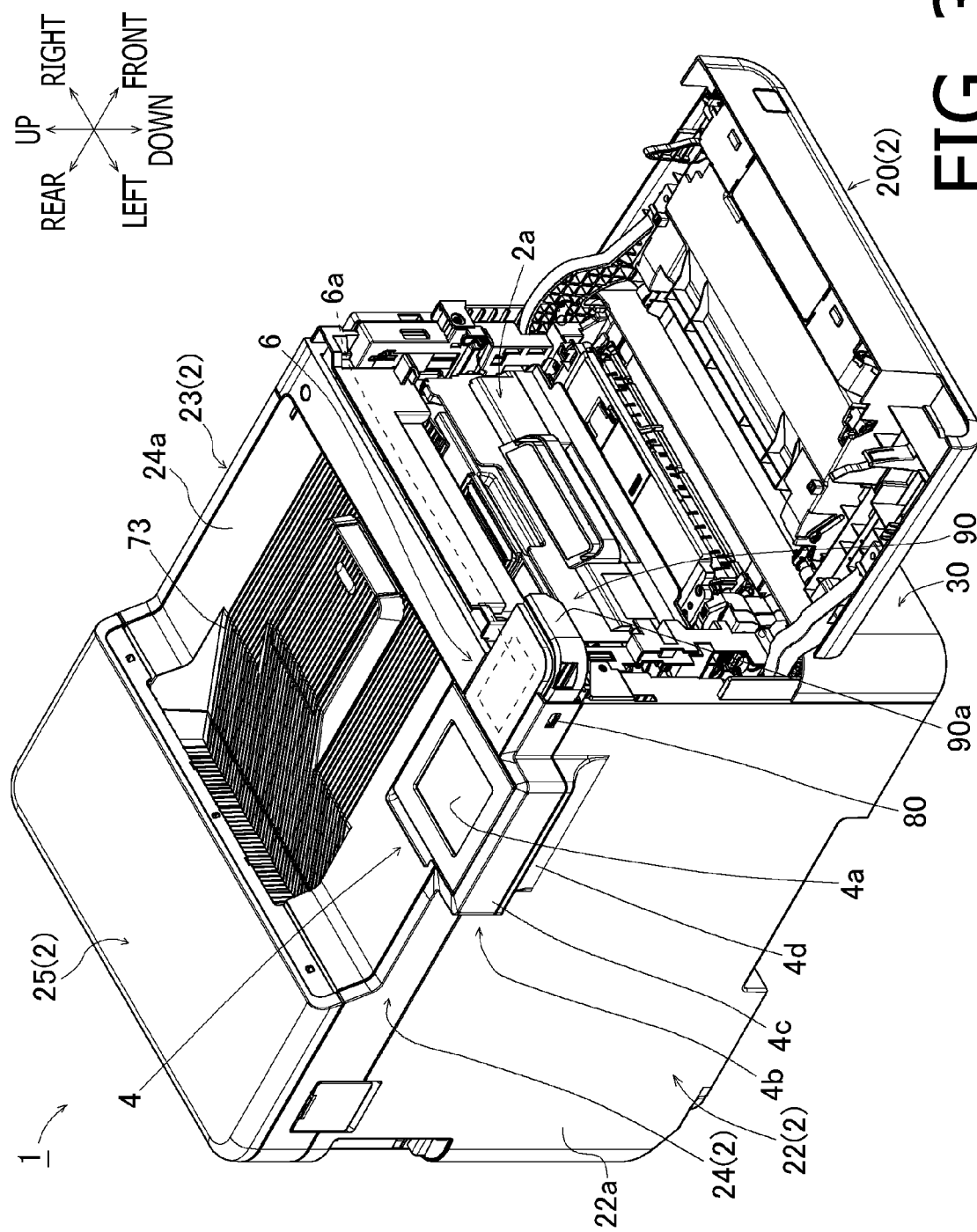
FIG. 3 is a perspective view of the image forming apparatus in a state where the openable cover is open.
Figure 4:
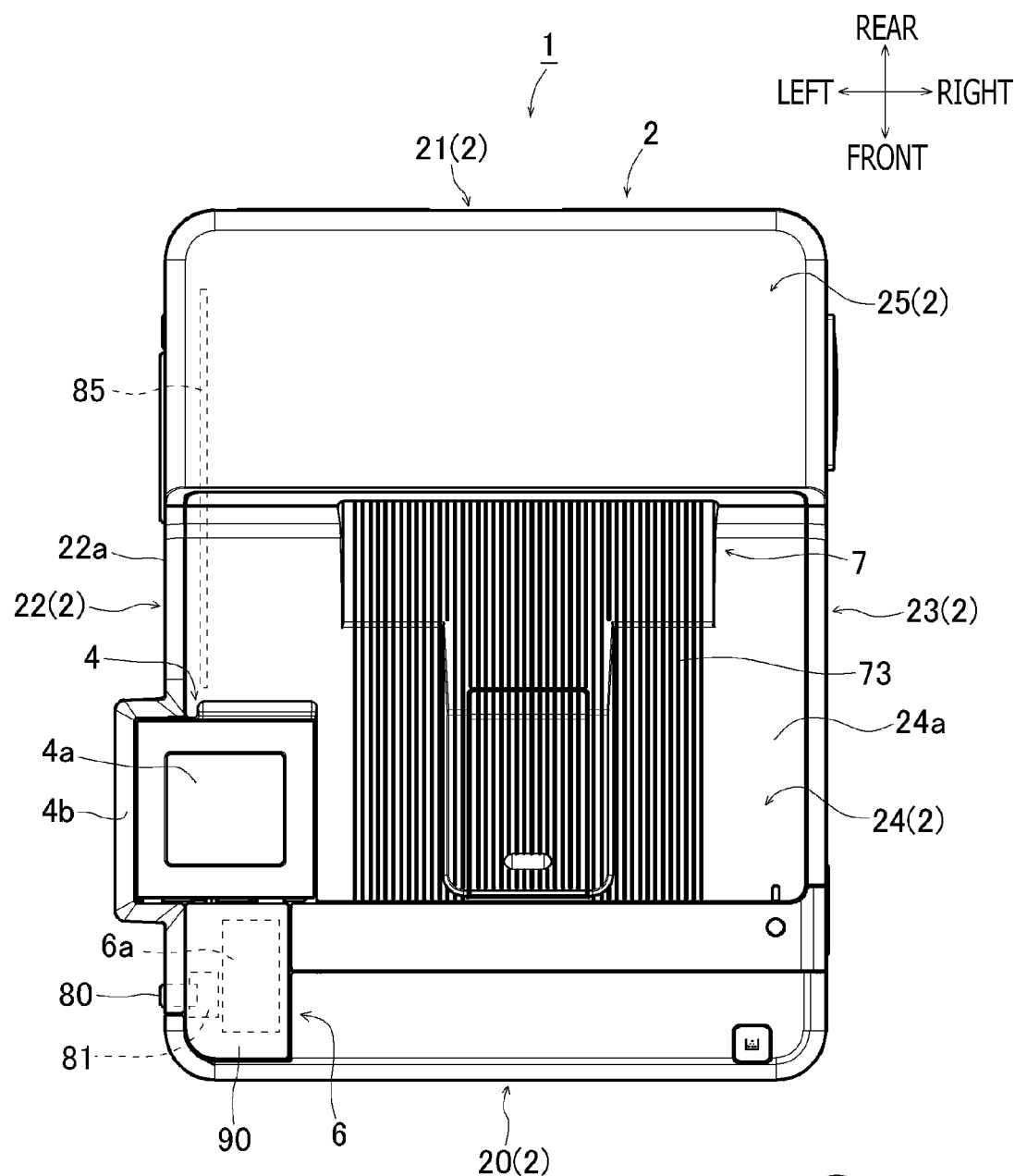
FIG. 4 is a plan view of the image forming apparatus in a state where the openable cover is closed.
Figure 5:
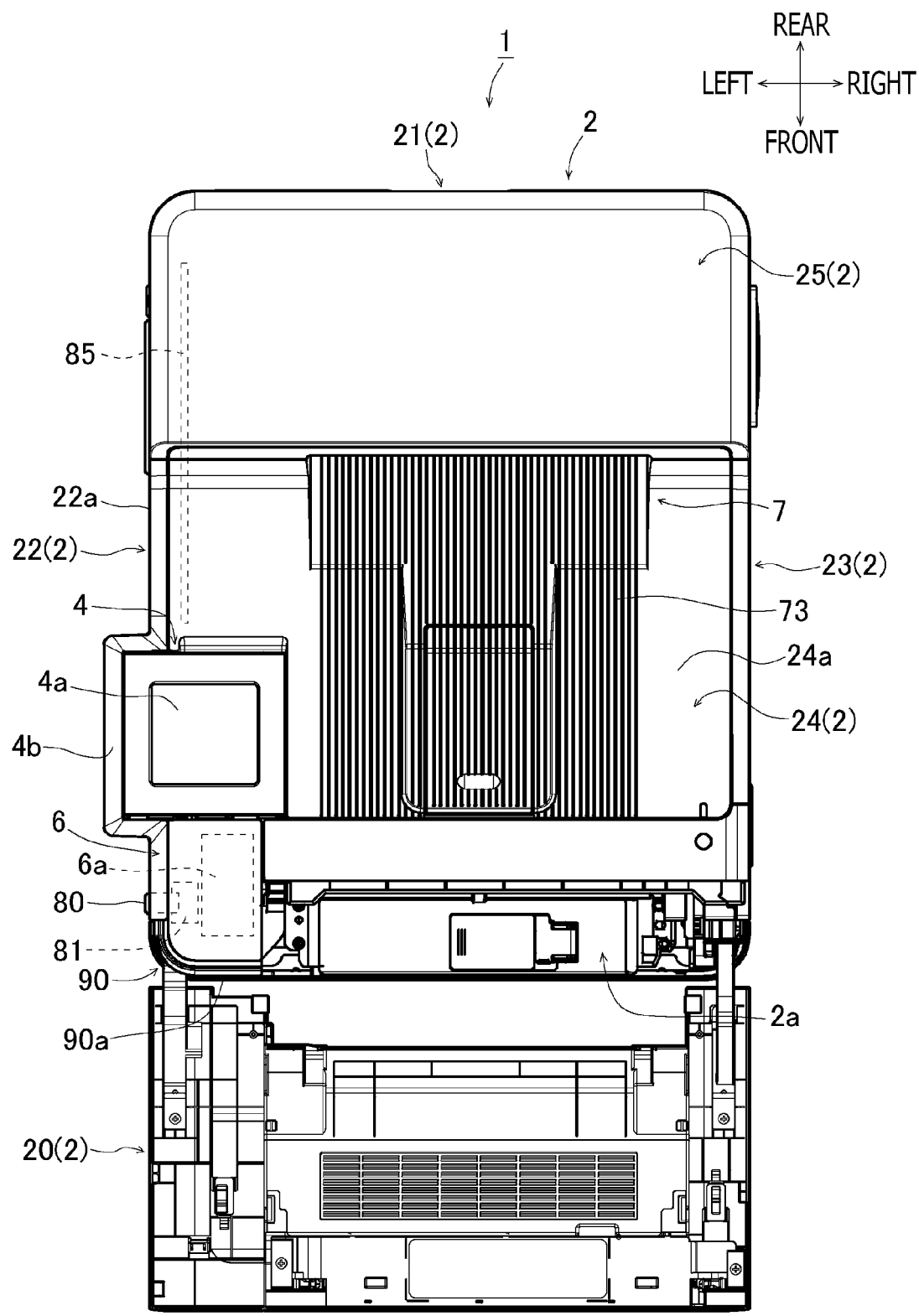
FIG. 5 is a plan view of the image forming apparatus in a state where the openable cover is open.
Figure 6:
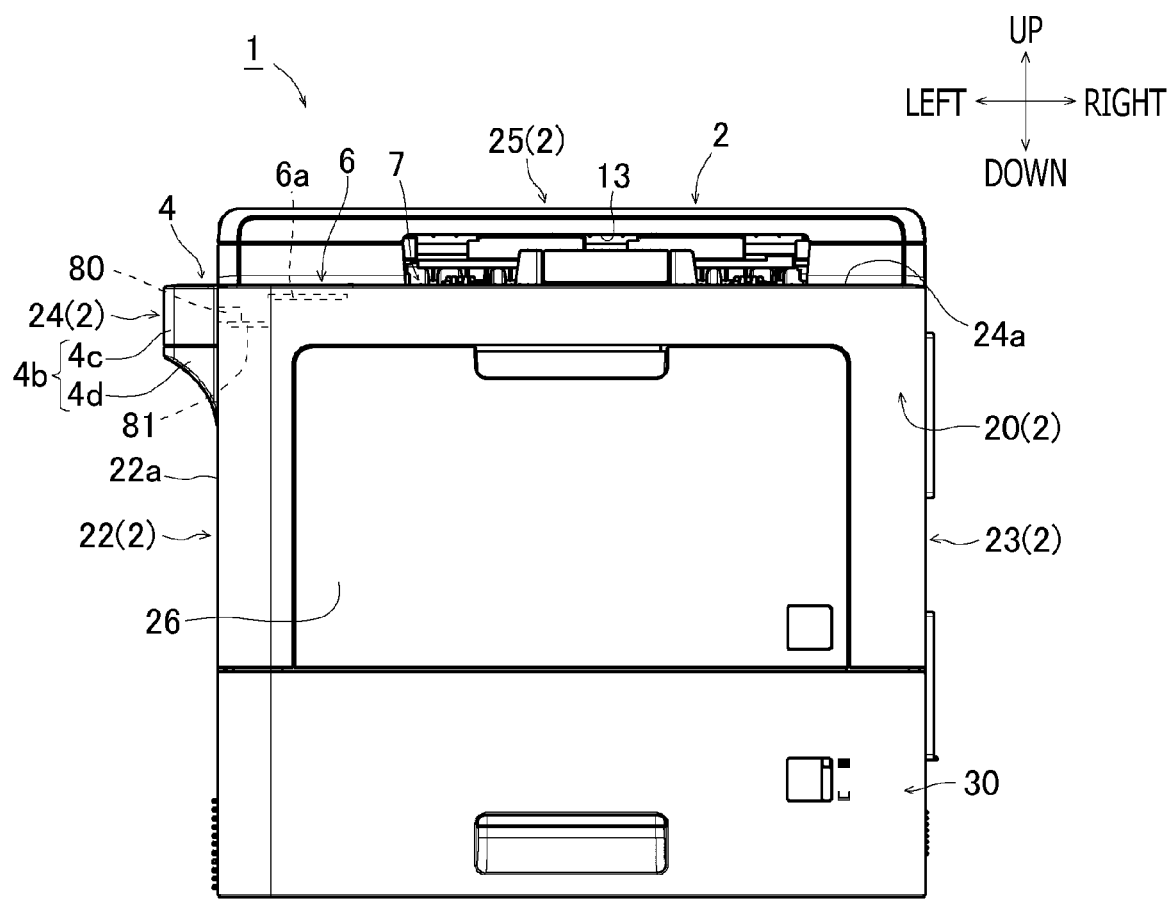
FIG. 6 is a front view of the image forming apparatus in a state where the openable cover is closed.
Figure 7:
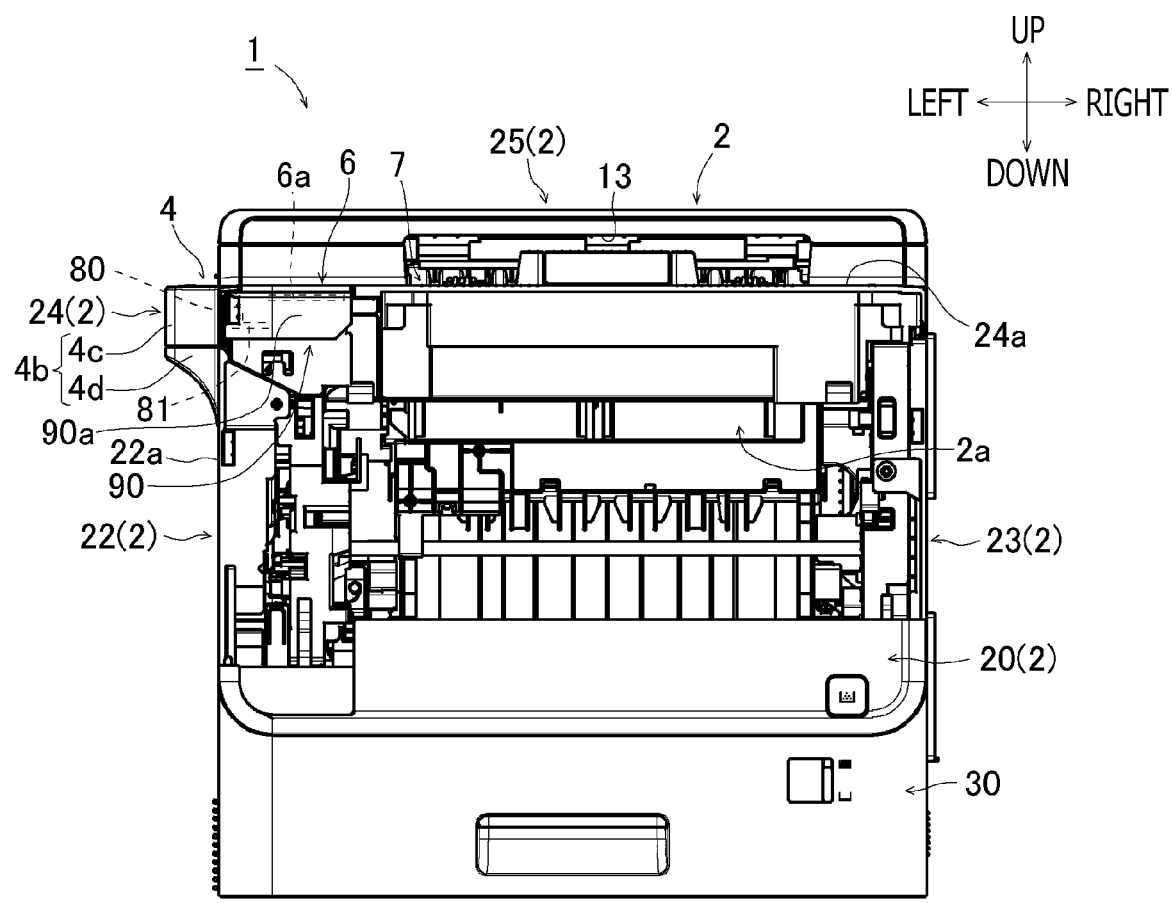
FIG. 7 is a front view of the image forming apparatus in a state where the openable cover is open.
Figure 8:
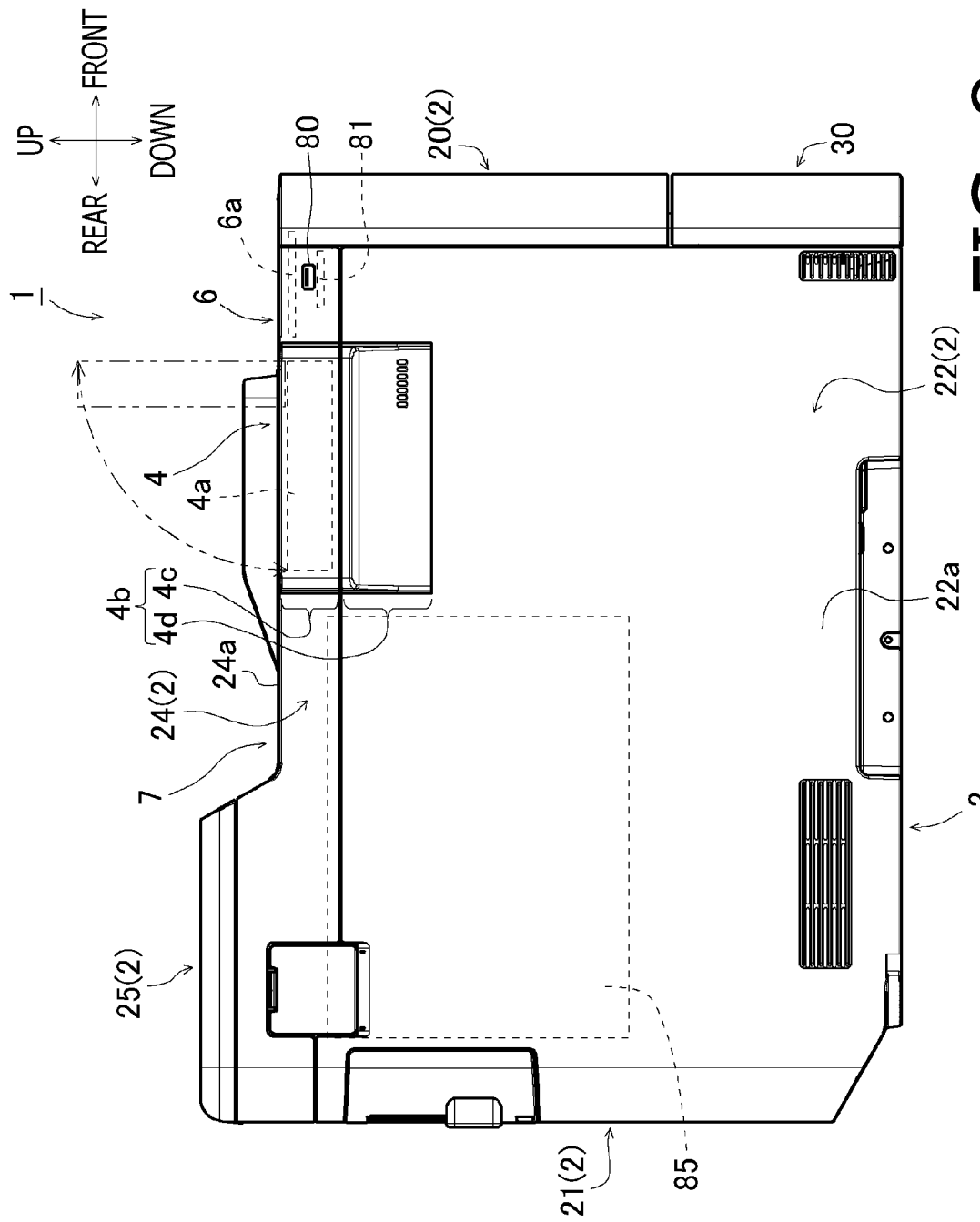
FIG. 8 is a left side view of the image forming apparatus in a state where the openable cover is closed.
Figure 9:
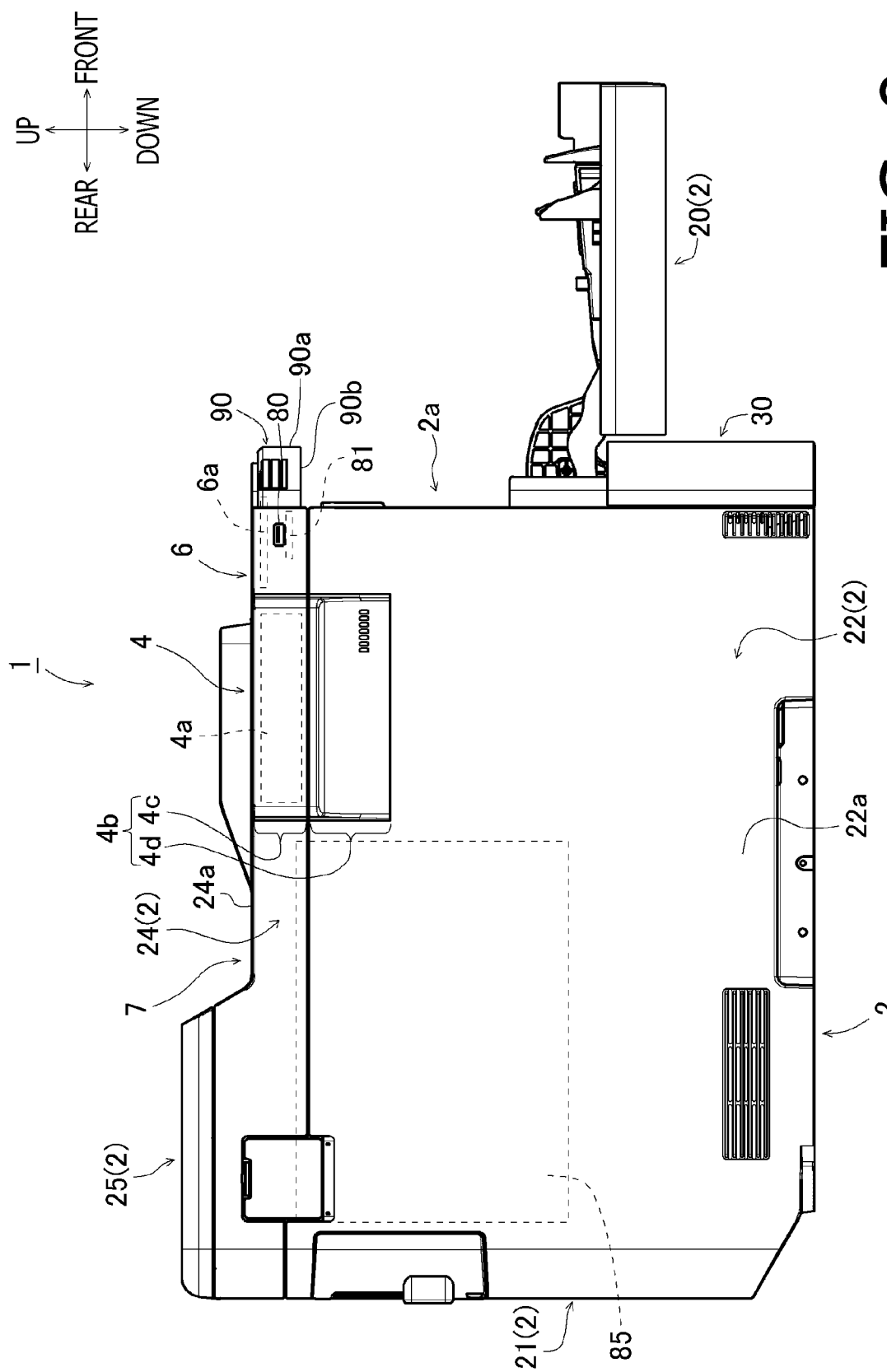
FIG. 9 is a left side view of the image forming apparatus in a state where the openable cover is open.

An image forming apparatus 1 shown in FIG. 1 is an embodiment of the image forming apparatus according to the present disclosure and includes a housing 2, a sheet feeder 3, an image forming part 5, a discharging part 7, a re-conveying part 8 and a motor 9.

In the following description, a right-hand side and a left-hand side of FIG. 1 will be referred to as a front side and a rear side of the image forming apparatus 1, respectively. A near side and a far side with respect to a plane of FIG. 1 will be referred to as a left side and a right side of the image forming apparatus 1, respectively. Further, an upside and a downside of FIG. 1 will be referred to as an upside and a downside of the image forming apparatus 1, respectively.

The housing 2 accommodates the sheet feeder 3, the image forming part 5, the discharging part 7, the re-conveying part 8 and the motor 9. As shown in FIGS. 2-9, the housing 2 includes an openable cover 20, a rear cover 21, a left cover 22, a right cover 23, a top cover 24 and an upper end cover 25.

The openable cover 20 of the housing 2 is swingably supported with respect to other parts of the housing 2 and is configured to swing between a closed position where the openable cover 20 closes an opening 2a formed on the front side of the housing 2 and an open position where the openable cover 20 opens the opening 2a.

As shown in FIG. 1, the sheet feeder 3 is arranged at a lower part of the housing 2 and is configured to convey a sheet S supported by a sheet cassette 30 to the image forming part 5. The image forming part 5 is arranged on a downstream side with respect to the sheet feeder 3 in a conveying direction of the sheet S and is configured to form an image on the sheet S conveyed from the sheet feeder 3. The discharging part 7 is arranged on a downstream side with respect to the image forming part 5 in the conveying direction of the sheet S and is configured to discharge the sheet S on which an image is formed by the image forming part 5 to outside the image forming apparatus 1.

A discharging direction A of the sheet S in the image forming apparatus 1 is a direction from the rear side to the front side of the image forming apparatus 1. That is, a downstream side of the housing 2 in the discharging direction A is the front side of the housing 2.

The image forming apparatus 1 has a conveying path L1 for the sheet S that extends from the sheet feeder 3, through the image forming part 5, to the discharging part 7. The sheet feeder 3 includes a sheet cassette 30 that supports the sheets S, a sheet feeding mechanism 32, a conveying roller pair 33, and a registration roller pair 34 that conveys the sheet S along the conveying path L1.

The sheet feeding mechanism 32 includes a sheet feeding roller 32a and a separating roller 32b. The sheet feeding roller 32a is a roller configured to feed the sheets S supported by the sheet cassette 30 toward the separating roller 32b. The separating roller 32b is arranged on a downstream side with respect to the sheet feeding roller 32a in the conveying direction of the sheet S.

The sheets S fed by the sheet feeding roller 32a toward the separating roller 32b are separated one by one between the separating roller 32b and a conventionally known separating pad. Each separated sheet S is conveyed along the conveying path L1 toward the conveying roller pair 33.

Rollers of the conveying roller pair 33 are rollers that apply conveying force to the sheet S and are arranged on a downstream side with respect to the sheet feeding mechanism 32 in the conveying direction of the sheet S. The sheet S conveyed from the sheet feeding mechanism 32 toward the conveying roller pair 33 is conveyed by the conveying roller pair 33 along the conveying path L1 toward the registration roller pair 34.

The registration roller pair 34 is arranged on a downstream side with respect to the conveying roller pair 33 in the conveying direction of the sheet S. The registration roller pair 34 corrects attitude of the sheet S by causing a distal end of the conveyed sheet S to temporarily stop moving. Then, the registration roller pair 34 conveys the sheet S toward a transferring position in the image forming part 5 at a particular timing.

The image forming apparatus 1 includes an MP tray 26 configured to support a plurality of sheets S, and a sheet feeding mechanism 27 that feeds the sheets S supported by the MP tray 26. The sheet feeding mechanism 27 is configured to separate and pick up the sheets S supported by the MP tray 26 one by one and conveys the picked up sheet S toward the registration roller pair 34. The sheet feeding mechanism 27 includes a pick up roller 28 being an example of a sheet feeding roller and a separating roller 29.

The image forming part 5 is arranged inside the housing 2 and is configured to form an image on the conveyed sheet S. The image forming part 5 includes a process cartridge 50 configured to transfer an image on a surface of the sheet S conveyed from the sheet feeder 3, an exposing unit 56 that exposes an outer surface of a photosensitive drum 54 of the process cartridge 50 to light, and a fixing part 60 configured to fix the image transferred onto the sheet S by the process cartridge 50.

The process cartridge 50 is arranged inside the housing 2 at a position higher than the sheet feeder 3. A user can replace the process cartridge 50 through the opening 2a. The process cartridge 50 includes a developing agent chamber 51, a supplying roller 32, a developing roller 53, the photosensitive drum 54 and a transfer roller 55.

The exposing unit 56 includes one or more laser diodes, one or more polygonal mirrors, one or more lenses and one or more reflecting mirrors. The exposing unit 56 is configured to expose the outer surface of the photosensitive drum 54 to light by emitting laser beam toward the photosensitive drum 54 based on image data input to the image forming apparatus 1.

The developing agent chamber 51 accommodates toner which serves as developing agent according to the illustrative embodiment. The toner accommodated in the developing agent chamber 51 is conveyed toward the supplying roller 52 while being agitated by a conventionally known agitating member. The supplying roller 52 supplies the toner conveyed from the developing agent chamber 51 to the developing roller 53.

The developing roller 53 is arranged to closely contact with the supplying roller 52 and holds toner supplied by the supplying roller 52 and charged by a conventionally known slide contacting member. Furthermore, a developing bias is applied to the developing roller 53 by a conventionally known bias applying unit.

The photosensitive drum 54 is arranged adjacent to the developing roller 53. The outer surface of the photosensitive drum 54 is evenly charged by a conventionally known charger and is then exposed to light by the exposing unit 56. Potentials of portions of the photosensitive drum 54 exposed to light become lower than the other portions and an electrostatic latent image based on the image data is thereby formed on the photosensitive drum 54. Then, the charged toner is supplied from the developing roller 53 onto the outer surface of the photosensitive drum 54 on which the electrostatic latent image is formed, and the electrostatic latent image is thereby developed into a developing agent image.

The transfer roller 55 is arranged to oppose to the photosensitive drum 54, and a negative transfer bias is applied to the transfer roller 55 by a conventionally known bias applying unit. The developing agent image formed on the outer surface of the photosensitive drum 54 is transferred onto the surface of the sheet S by conveying the sheet S while nipping the sheet S between the photosensitive drum 54 onto which the developing agent image is formed and the transfer roller 55 (i.e., a transfer position) in a state where the transfer bias is applied on the outer surface of the transfer roller 55.

The fixing part 60 includes a heating roller 61 and a pressing roller 62. The heating roller 61 is driven to rotate by a driving force of the motor 9 and is heated by electricity supplied from a conventionally known power unit. The pressing roller 62 is arranged to oppose to the heating roller 61 and is in close contact with the heating roller 61 to be driven to rotate by the heating roller 61. As the sheet S onto which the developing agent image is transferred is conveyed along the conveying path L1 to the fixing part 60, the fixing part 60 conveys the sheet S while nipping the sheet S between the heating roller 61 and the pressing roller 62 to fix the developing agent image on the sheet S.

A first intermediate discharging roller pair 70 and a second intermediate discharging roller pair 71 are arranged inside the housing 2 on a downstream side with respect to the image forming part 5 in the sheet conveying direction. Each of the intermediate discharging roller pairs 70 and 71 conveys the sheet S conveyed from the fixing part 60 along the conveying path L1 toward a discharging roller pair 72 which will be described later.

The discharging part 7 includes the discharging roller pair 72 and a discharging tray 73. The discharging roller pair 72 is configured to be capable of conveying the sheet S conveyed by the intermediate discharging roller pairs 70 and 71 and discharging the sheet S to outside the housing 2. The discharging tray 73 is formed on an upper surface of the top cover 24 of the housing 2 and supports the sheet S discharged to outside the housing 2 by the discharging roller pair 72.

[Re-Conveying Path L2]

The image forming apparatus 1 includes the re-conveying path L2 formed below the image forming part 5. When executing duplex printing with the image forming apparatus 1, the sheet S is conveyed toward the image forming part 5 again along the re-conveying path L2. The re-conveying path L2 is a path for conveying the sheet S onto which an image is formed on one side by the image forming part 5 toward the image forming part 5 again.

The re-conveying path L2 diverges from the conveying path L1 at a diverging part 10 defined along the conveying path L1 between the first intermediate discharging roller pair 70 and the second intermediate discharging roller pair 71, and joins the conveying path L1 at a joining part 11 positioned along the conveying path L1 between the conveying roller pair 33 and the registration roller pair 34.

The sheet S conveyed to the re-conveying path L2 is further conveyed toward the image forming part 5 by a second re-conveying roller pair 36 and a first re-conveying roller pair 35 provided along the re-conveying path L2.

[Switch Back Path L3]

The image forming apparatus 1 includes a switch back path L3 formed behind the image forming part 5. The switch back path L3 is a path for switching the front and the rear of the sheet S before conveying the sheet S from the conveying path L1 to the re-conveying path L2. As shown in FIG. 1, the switch back path L3 is formed to the upper end cover 25 of the housing 2.

The switch back path L3 is formed in a U-shape, diverging from the conveying path L1 at the diverging part 10, extending upward in a direction opposite to the re-conveying path L2 and then making a U-turn to extend toward the front. The switch back path L3 is arranged upstream of the re-conveying path L2 in the sheet conveying direction of the sheet S. An end of the switch back path L3 opposite to an end connected to the re-conveying path L2 is an opening 13 that is open at a front side of the upper end cover 25. The switch back path L3 is configured such that a portion of the sheet S introduced to the switch back path L3 that does not fit into the switch back path L3 protrudes from the opening 13 to outside the housing 2.

The switch back path L3 is provided with a switch back roller pair 74. The switch back roller pair 74 is configured to be capable of switching its rotating direction and thus can be driven in a rotating direction for introducing the sheet S to the switch back path L3 (normal rotating direction) and in a rotating direction for conveying the sheet S from the switch back path L3 toward the re-conveying path L2 (reverse rotating direction).

In the image forming apparatus 1, by the re-conveying part 8 including the re-conveying path L2 and the switch back path L3, it is possible to convey the sheet S, onto which an image is formed on one side by the image forming part 5 arranged along the conveying path L1, toward the image forming part 5 again through the re-conveying path L2 and the switch back path L3 to form an image on the other side of the sheet S. That is, with the image forming apparatus 1, it is possible to execute duplex printing.

[Switch Back Mechanism]

As shown in FIG. 1, the image forming apparatus 1 is provided with a flapper 12 at the diverging part 10. The flapper 12 is a member for switching the conveying direction of the sheet S at the diverging part 10 between the conveying path L1 and the re-conveying path L2 and switch back path L3. The flapper 12 is provided to the housing 2 to be swingable with respect to the housing 2. When guiding the sheet S conveyed from the fixing part 60 toward the discharging tray 73, the flapper 12 is positioned at a discharging position X where the flapper 12 closes the opening 10a that leads to the re-conveying path L2. When guiding the sheet S conveyed from the fixing part 60 toward the re-conveying path L2 and the switch back path L3, the flapper 12 swings frontward from the discharging position X to a re-conveying position Y to open the opening 10a and close the conveying path L1 that leads to the discharging tray 73.

When the flapper 12 is at the re-conveying position Y, the sheet S conveyed from the conveying path L1 to the opening 10a is conveyed obliquely upward and rearward and is firstly introduced to the switch back path L3. The sheet S introduced to the switch back path L3 is passed to the switch back roller pair 74 and is conveyed toward the switch back path L3 until the entire length of the sheet S along the conveying direction passes through the opening 10a. After the entire length of the sheet S passed through the opening 10a, the rotating direction of the switch back roller pair 74 is reversed and the sheet S is conveyed from the switch back path L3 toward the re-conveying path L2. At this time, the flapper 12 is swung toward the discharging position X to close the opening 10a. Then, the sheet S is passed from the switch back roller pair 74 to the second re-conveying roller pair 36 and the first re-conveying roller pair 35, conveyed along the re-conveying path L2 and introduced to the conveying path L1 again at the joining part 11.

[USB Port]

As shown in FIGS. 2-9, the image forming apparatus 1 includes a USB port 80 arranged at a side face 22a of the left cover 22. The USB port 80 is a port for inserting a USB memory, and the image forming apparatus 1 can directly read data stored in the USB memory inserted to the USB port 80. The USB port 80 is connected to a USB substrate 81. The USB substrate 81 is connected to a main substrate 85 arranged behind the left cover 22.

[Operation Panel]

On an upper surface 24a of the top cover 24 of the housing 2 of the image forming apparatus 1, an operation panel 4 is provided that receives input operations to the image forming apparatus 1 and displays status of the image forming apparatus 1. The operation panel 4 includes a display 4a being a so-called touch panel, and a panel accommodating part 4b that accommodates the display 4a. The display 4a includes a portion that protrudes from a side face of the housing 2, and a portion of the panel accommodating part 4b protrudes widthwise from the side face 22a of the left cover 22 of the housing 2. In the operation panel 4 of the image forming apparatus 1, by such configuration, it is possible to secure an area for the display 4a and operability and visibility of the display 4a are improved.

At the operation panel 4, the display 4a is supported to be swingable with respect to the panel accommodating part 4b and is configured to be swingable between a position where a displaying surface of the display 4a becomes parallel to the upper surface 24a of the top cover 24 and a position where the displaying surface becomes perpendicular to the upper surface 24a. That is, the operation panel 4 is configured such that an angle of the display 4a can be adjusted to an angle with high operability and visibility by causing the display 4a to swing with respect to the panel accommodating part 4b. Although, in the present embodiment, the operation panel 4 configured such that the display 4a is swingable with respect to the panel accommodating part 4b is illustrated, it should be noted that the operation panel 4 of the image forming apparatus 1 may have a configuration in which the display 4a is fixed to the panel accommodating part 4b such that the display 4a cannot swing with respect to the panel accommodating part 4b.

The panel accommodating part 4b is configured from portions of the left cover 22 and the top cover 24 of the housing 2. The panel accommodating part 4b includes a first portion 4c formed by making a portion of the top cover 24 to protrude leftward and a second portion 4d formed by making a portion of the left cover 22 to protrude leftward. That is, in the image forming apparatus 1, a portion of the operation panel 4 protruding from the side face of the housing 2 is formed with the first portion 4c and the second portion 4d of the panel accommodating part 4b. The first portion 4c is a portion including an upper end of the operation panel 4, and the second portion 4d is a portion formed such that its protruding amount with respect to the side face of the housing 2 gradually decreases from the lower end of the first portion 4c toward the lower side. Although, in the present embodiment, the operation panel 4 in which the first portion 4c and the second portion 4d are provided to the panel accommodating part 4b is illustrated, it should be noted that the operation panel 4 of the image forming apparatus 1 may be configured such that the panel accommodating part 4b is provided with the first portion 4c but is not provided with the second portion 4d.

[NFC Communication Part]

The image forming apparatus 1 is provided with an NFC communication part 6 for inputting information from an external terminal to the image forming apparatus 1 through wireless communication on the upper surface 24a of the top cover 24. The NFC communication part 6 is a portion that enables data transfer between the image forming apparatus 1 and an external terminal provided with an NFC function such as a smartphone and includes an NFC substrate 6a. By holding an external terminal provided with the NFC function over the NFC communication part 6, data transfer between the external terminal and the image forming apparatus 1 can be performed through NFC communication.

The NFC communication part 6 includes a substrate cover 90 that accommodates the NFC substrate 6a. Furthermore, along with the NFC substrate 6a, the USB substrate 81 is accommodated in the substrate cover 90. An end face 90a of the substrate cover 90 at the discharging direction A side (i.e., front side) is covered by the openable cover 20 when the openable cover 20 is at the closed position but is exposed to outside when the openable cover 20 is at the open position.

[Arrangement of USB Port]

As shown in FIGS. 2-9, the image forming apparatus 1 includes the housing 2, the discharging tray 73 provided at the upper surface 24a of the housing 2 and onto which the sheet S is to be discharged, the operation panel 4 provided to the housing 2 outside the discharging tray 73 in a width direction perpendicular to the discharging direction A of the sheet S, and the USB port 80 provided at the side face 22a of the housing 2 in the width direction. In the image forming apparatus 1, at least a portion of the operation panel 4 protrudes with respect to the side face 22a of the housing 2 in the width direction. In the image forming apparatus 1, the USB port 80 is arranged at the side face 22a of the housing 2 where the operation panel 4 protrudes, on a downstream side with respect to the operation panel 4 in the discharging direction A, at a position that is lower than an upper end of the operation panel 4 and is higher than a lower end of the operation panel 4. Specifically, an upper end of the USB port 80 is positioned lower than the upper end of the operation panel 4 and a lower end of the USB port 80 is positioned higher than the lower end of the operation panel 4.

In the image forming apparatus 1 having such configuration, the USB port 80 is arranged near and in front of the operation panel 4 and thus accessibility from a user standing in front of the image forming apparatus 1 and accessibility from the operation panel 4 to the USB port 80 are high. Furthermore, in the image forming apparatus 1, in a case where a person or object comes close to a USB memory inserted to the USB port 80 from above, from below or from the left, the person or object will contact with the operation panel 4 before contacting with the USB memory and thus contact with the USB memory can be suppressed. Accordingly, in the image forming apparatus 1, it is possible to suppress application of unexpected load on the USB memory inserted to the USB port 80.

In the image forming apparatus 1, the USB port 80 is arranged at a position that is lower than an upper surface of the substrate cover 90 and is higher than a lower surface 90b of the substrate cover 90. Specifically, the upper end of the USB port 80 is positioned lower than the upper surface of the substrate cover 90 and the lower end of the USB port 80 is positioned higher than the lower surface 90b of the substrate cover 90.

In the image forming apparatus 1 having such configuration, in a case where a person or object comes close to a USB memory inserted to the USB port 80 from above, the person or object will contact with the substrate cover 90 before contacting with the USB memory and thus contact with the USB memory can be suppressed. Accordingly, the image forming apparatus 1 has a configuration in which application of unexpected load on the USB memory inserted to the USB port 80 is less likely to occur.

A protruding amount of the operation panel 4 may be determined based on the USB memory to be used. Since there are variety of USB memories having different sizes, the preferable protruding amount cannot be specified. In general, the protruding amount may be substantially equal to or greater than a length of the USB memory excluding the inserting part so as to prevent damage on the USB memory. However, even if the protruding amount is less than the length of the USB memory, the protruded operation panel 4 serves to prevent damage on the USB memory in some degree. Accordingly, even if the protruding amount is within a range of, for example, 10 mm to 30 mm given that the protruding amount of the USB memory is, for example, 40 mm, the protruded operation panel 4 serves to prevent damage on the USB memory in some degree.

[Relationship between Operation Panel and USB Port]

In the image forming apparatus 1, the portion of the operation panel 4 protruding from the side face of the housing 2 includes the first portion 4c including the upper end of the operation panel 4 and the second portion 4d formed such that the protruding amount with respect to the side face of the housing 2 decreases from the lower end of the first portion 4c toward the lower side.

In the image forming apparatus 1 having such configuration, the operation panel 4 is hard to be held due to the shape of the second portion 4d and thus it becomes possible to suppress the operation panel 4 from being held by a user when the user attempts to lift up the image forming apparatus 1. Since holding of the operation panel 4 by the user is suppressed, contact of the hand or arm of the user with the USB memory inserted to the USB port 80 near the operation panel 4 can be suppressed and thus damage on the USB memory and/or the USB substrate 81 can be suppressed.

In the image forming apparatus 1, the USB port 80 is arranged at the position that is lower than the upper end of the first portion 4c and is higher than the lower end of the first portion 4c. Specifically, an upper end of the USB port 80 is positioned lower than the upper end of the first portion 4c and the lower end of the USB port 80 is positioned higher than the lower end of the first portion 4c. In the image forming apparatus 1 having such configuration, even if the user holds the operation panel 4, the user will be holding the second portion 4d and thus it is less likely that the user's arm or hand reaches the height of the first portion 4c when lifting up the image forming apparatus 1. In the image forming apparatus 1, since the USB port 80 is arranged at the position that overlaps with the first portion 4c in the up-down direction, it is possible to suppress the user from contacting the USB memory inserted to the USB port 80.

In the image forming apparatus 1, the display 4a is swingable between an accommodated position where the display 4a is accommodated in the panel accommodating part 4d and the displaying surface of the display 4a becomes parallel to the upper surface 24a of the housing 2 and a protruded position where a portion of the display 4a protrudes from the panel accommodating part 4b, and the USB port 80 is arranged at a position that is lower than the upper surface of the display 4a positioned at the accommodated position.

The image forming apparatus 1 having such configuration is configured such that the display 4a positioned at the accommodated position does not swing further downward and thus it is less likely that the user's arm or hand reaches below the upper surface 24a of the housing 2 when the user displaces the display 4a from the protruded position to the accommodated position. Accordingly, in the image forming apparatus 1, it is possible to suppress application of unexpected load on the USB memory inserted to the USB port 80.

[Relationship between Substrate Cover and USB Port]

In the image forming apparatus 1, the housing 2 includes the opening 2a formed on the side face on the downstream side of the housing 2 in the discharging direction A, the openable cover 20 capable of opening and closing the opening 2a, and the substrate cover 90 constituting a portion of the upper surface 24a of the housing 2 and covering the USB substrate 81 to which the USB port 80 is provided. The substrate cover 90 is arranged on a downstream side with respect to the operation panel 4 in the discharging direction A and at least a portion of the substrate cover 90 is positioned on a downstream side with respect to the USB port 80 in the discharging direction A. The end face 90a on the downstream side of the substrate cover 90 in the discharging direction A is covered by the openable cover 20 when the openable cover 20 is closed but is exposed to outside when the openable cover 20 is open.

In the image forming apparatus 1 having such configuration, in a state where the openable cover 20 is open, the substrate cover 90 protrudes forward with respect to the USB port 80. In the image forming apparatus 1 having such configuration, in a case where a person or object comes close to a USB memory inserted to the USB port 80 from the front, the person or object will contact with the substrate cover 90 before contacting with the USB memory and thus contact with the USB memory can be suppressed. Accordingly, in the image forming apparatus 1, it is possible to suppress the user from contacting the USB memory inserted to the USB port 80.

[Arrangement around Operation Panel]

In the image forming apparatus 1, the NFC substrate 6a is provided next to the USB port 80 in the width direction of the housing 2 and on a downstream side with respect to the operation panel 4 in the discharging direction A, and the NFC substrate 6a is covered by the substrate cover 90.

In the image forming apparatus 1 having such configuration, since various functions such as the USB port 80 for inserting a USB memory and the NFC communication part 6 over which an external terminal is to be held are aggregated around the operation panel 4 including the display 4a being an operating part and/or displaying part, it is possible to improve operability of the image forming apparatus 1.

What is claimed is:

1. An image forming apparatus comprising:
   a housing;
   a discharging tray provided at an upper surface of the housing and onto which a sheet is to be discharged;
   an operation panel provided to the housing outside the discharging tray in a width direction perpendicular to a discharging direction of the sheet, at least a portion of the operation panel protruding with respect to a side face of the housing in the width direction;
   a USB port provided at the side face of the housing in the width direction, the USB port being arranged at the side face of the housing where the operation panel protrudes, on a downstream side with respect to the operation panel in the discharging direction, at a position that is lower than an upper end of the operation panel and is higher than a lower end of the operation panel,
   wherein the portion of the operation panel protruding from the side face of the housing includes:
   a first portion including the upper end of the operation panel; and
   a second portion formed such that a protruding amount thereof with respect to the side face of the housing decreases from the lower end of the first portion toward the lower side, and
   wherein the USB port is arranged at a position that is lower than an upper end of the first portion and is higher than a lower end of the first portion.

2. The image forming apparatus of claim 1,
   wherein the housing includes:
   an opening formed on a side face on a downstream side face of the housing in the discharging direction; and
   an openable cover capable of opening and closing the opening; and
   a substrate cover constituting a portion of the upper surface of the housing and covering a USB substrate to which the USB port is provided,
   wherein the substrate cover is arranged on a downstream side with respect to the operation panel in the discharging direction and at least a portion of the substrate cover is positioned on a downstream side with respect to the USB port in the discharging direction, and
   wherein an end face of the substrate cover on the downstream side in the discharging direction is covered by the openable cover when the openable cover is closed but is exposed to outside when the openable cover is open.

3. The image forming apparatus of claim 2,
wherein an NFC substrate is provided next to the USB port in the width direction of the housing and on a downstream side with respect to the operation panel in the discharging direction, and
wherein the NFC substrate is covered by the substrate cover.

4. The image forming apparatus of claim 2,
wherein the USB port is arranged at a position that is lower than an upper surface of the substrate cover and is higher than a lower surface of the substrate cover.

5. The image forming apparatus of claim 1,
wherein a downstream side of the housing in the discharging direction is a front side of the housing.

6. The image forming apparatus of claim 1,
wherein the operation panel includes:
  a display; and
  a panel accommodating part that accommodates the display,
wherein the display is swingable between an accommodated position where the display is accommodated in the panel accommodating part and a displaying surface of the display is parallel to the upper surface of the housing, and a protruded position where a portion of the display protrudes from the panel accommodating part, and
wherein the USB port is arranged at a position that is lower than an upper surface of the display positioned at the accommodated position.

7. An image forming apparatus comprising:
a housing having an opening formed on a front face;
a cover positioned at the front face of the housing and configured to open and close the opening;
a discharging tray provided at an upper surface of the housing and onto which a sheet is to be discharged along a front-rear direction toward the front face;
an operation panel provided to the housing outside the discharging tray in a width direction perpendicular to the front-rear direction, at least a portion of the operation panel protruding with respect to a side face of the housing in the width direction; and
a USB port provided at the side face of the housing in the width direction, the USB port being arranged at the side face of the housing where the operation panel protrudes, between the operation panel and the cover in the front-rear direction, and at a position that is lower than an upper end of the operation panel and is higher than a lower end of the operation panel.

8. The image forming apparatus of claim 7,
wherein the portion of the operation panel protruding from the side face of the housing includes:
  a first portion including the upper end of the operation panel; and
  a second portion formed such that a protruding amount thereof with respect to the side face of the housing decreases from the lower end of the first portion toward the lower side, and
wherein the USB port is arranged at a position that is lower than an upper end of the first portion and is higher than a lower end of the first portion.

9. The image forming apparatus of claim 7,
wherein the cover is on a downstream side of the discharging tray in a discharging direction of the sheet.

10. The image forming apparatus of claim 7,
wherein an NFC substrate is provided next to the USB port in the width direction and is positioned between the operation panel and the cover in the front-rear direction.

11. The image forming apparatus of claim 10,
wherein the NFC substrate and the USB port overlaps in the front-rear direction.

12. The image forming apparatus of claim 7,
wherein the operation panel is provided at the upper surface of the housing.

\* \* \* \* \*